United States Patent
Hata

(10) Patent No.: US 8,541,080 B2
(45) Date of Patent: Sep. 24, 2013

(54) PACKAGING MATERIAL FOR BATTERY CASE AND BATTERY CASE

(75) Inventor: Hiroshi Hata, Isehara (JP)

(73) Assignee: Showa Denko Packaging Co., Isehara-shi (JP)

( * ) Notice: Subject to any disclaimer, the term of this patent is extended or adjusted under 35 U.S.C. 154(b) by 0 days.

(21) Appl. No.: 13/299,017

(22) Filed: Nov. 17, 2011

(65) Prior Publication Data

US 2012/0064319 A1   Mar. 15, 2012

Related U.S. Application Data

(63) Continuation of application No. 11/915,589, filed as application No. PCT/JP2006/308994 on Apr. 28, 2006, now Pat. No. 8,129,008.

(30) Foreign Application Priority Data

May 27, 2005   (JP) .................. 2005-154883

(51) Int. Cl.
| | |
|---|---|
| *B32B 1/02* | (2006.01) |
| *B32B 23/00* | (2006.01) |
| *B32B 1/08* | (2006.01) |

(52) U.S. Cl.
USPC ....... 428/35.7; 428/34.1; 428/34.2; 428/35.9; 428/36.9

(58) Field of Classification Search
USPC ................ 428/34.1, 34.2, 35.7, 35.9, 36.9, 428/461
See application file for complete search history.

(56) References Cited

U.S. PATENT DOCUMENTS

| | | | | |
|---|---|---|---|---|
| 5,006,378 | A | * | 4/1991 | Itaba et al. .................. 428/34.9 |
| 5,336,549 | A | | 8/1994 | Nishimoto et al. .......... 428/213 |
| 6,623,812 | B1 | | 9/2003 | Tanaka et al. ................ 428/1.54 |
| 7,205,042 | B2 | | 4/2007 | Arao et al. ................... 428/220 |
| 2010/0040942 | A1 | | 2/2010 | Hatta et al. ................... 429/163 |
| 2010/0227213 | A1 | | 9/2010 | Hata ............................ 429/163 |
| 2012/0064319 | A1 | | 3/2012 | Hata | |

FOREIGN PATENT DOCUMENTS

| | | |
|---|---|---|
| JP | 10-157008 | 6/1998 |
| JP | 2000-123799 | 4/2000 |
| JP | 2001-6631 | 1/2001 |
| JP | 2002-216714 | 8/2002 |
| JP | 2004-139749 | 5/2004 |
| JP | 2004-265637 | 9/2004 |
| JP | 2004-362953 | 12/2004 |
| JP | 2005-22336 | 1/2005 |
| JP | 2005-26152 | 1/2005 |
| KR | 10-2003-0072398 | 9/2003 |
| WO | WO 99-40634 | 8/1999 |
| WO | WO 2004-108408 | 12/2004 |

OTHER PUBLICATIONS

U.S. Appl. No. 13/770,568, filed Feb. 19, 2013, Hata.

* cited by examiner

*Primary Examiner* — Marc Patterson
(74) *Attorney, Agent, or Firm* — Oblon, Spivak, McClelland, Maier & Neustadt, L.L.P.

(57) ABSTRACT

A packaging material for battery cases according to the present invention including a heat resistant resin oriented film layer 2 constituting an outer layer, a thermoplastic resin non-oriented film layer 3 constituting an inner layer, and an aluminum foil layer 4 disposed between both the film layers is characterized in that as the heat resistant resin oriented film, a heat resistant resin oriented film having a shrinkage percentage of 2 to 20% is used. With this packaging material, excellent formability can be secured without coating slip characteristics imparting components and sufficient volumetric energy density can be obtained.

4 Claims, 1 Drawing Sheet

PACKAGING MATERIAL FOR BATTERY CASE AND BATTERY CASE

This application is a continuation of U.S. application Ser. No. 11/915,589, filed Dec. 19, 2008, which is a National Stage of PCT/JP2006/308994, filed Apr. 28, 2006, which claims priority to Japanese Patent Application No. 2005-154883 filed on May 27, 2005, the entire disclosure of each of which is incorporated herein by reference in its entirety.

BACKGROUND OF THE INVENTION

1. Technical Field

The present invention relates to a packaging material for battery cases, such as, e.g., lithium-ion secondary battery cases.

In this specification, the wording of "aluminum" is used to include the meaning of an aluminum and its alloy.

2. Background Art

A lithium-ion secondary battery has been widely used as a power source of, e.g., a notebook-sized personal computer, a video camera, a cellular phone, or an electric automobile. As such a lithium-ion secondary battery, a battery in which a periphery of a battery body is covered with a case has been used. As the packaging material for cases, for example, a packaging material in which an outer layer made of an oriented polyamide film, an aluminum foil layer, and an inner layer made of a non-oriented polypropylene film are integrally bonded in this order is known (see Patent Document 1).

In such a packaging material for battery cases, since the packaging material is formed into various battery configurations, it is required to have high deep drawing formability. In order to give high deep drawing formability, conventionally, a packaging material in which fatty acid amide series slip characteristics imparting components are coated on a surface of an outer layer film to enhance the slipping of the material in a die at the time of forming (see Patent Document 2) or a packaging material comprising an aluminum foil layer and an outer layer film thicker than the aluminum foil layer have been employed.

Patent Document 1: JP 2001-6631, A
Patent Document 2: JP 2002-216714, A

DISCLOSURE OF THE INVENTION

Problems to be Solved by the Invention

In the structure in which fatty acid amide series slip characteristics imparting components are coated on a surface of an outer layer film, however, there is a problem that a step of coating the slip characteristics imparting components is required and therefore the productivity is low. Furthermore, there is another problem that the slip characteristics imparting components will evaporate at the time of vacuuming or sealing a battery and the evaporated components will adhere to the processing equipment, requiring a cleaning operation for removing the adhered components, which further decreases the productivity.

Furthermore, in a structure in which the thickness of the outer layer film is increased with respect to the thickness of the aluminum foil layer, there is a problem that the volumetric energy density of the battery deteriorates since the entire thickness of the packaging material increases.

The present invention was made in view of the aforementioned technical backgrounds, and aims to provide a packaging material for battery cases and a battery case capable of securing excellent formability without coating slip characteristics imparting components and obtaining sufficient volumetric energy density.

Means to Solve the Problems

In order to attain the aforementioned object, the present inventor has found new finding that a shrinkage percentage of a heat resistant resin oriented film layer constituting an outer layer of a packaging material affects formability of a packaging material and completed the present invention. That is, the present invention provides the following means.

[1] A packaging material for battery cases comprising a heat resistant resin oriented film layer constituting an outer layer, a thermoplastic resin non-oriented film layer constituting an inner layer, and an aluminum foil layer disposed between both the film layers,
wherein as the heat resistant resin oriented film, a heat resistant resin oriented film having a shrinkage percentage of 2 to 20% is used.

[2] A packaging material for battery cases comprising a heat resistant resin oriented film layer constituting an outer layer, a thermoplastic resin non-oriented film layer constituting an inner layer, and an aluminum foil layer disposed between both the film layers, wherein as the heat resistant resin oriented film layer, a biaxially-oriented polyamide film having a shrinkage percentage of 2 to 20%, a biaxially-oriented polyethylene naphthalate having a shrinkage percentage of 2 to 20%, or a biaxially-oriented polyethylene terephthalate having a shrinkage percentage of 2 to 20% is used.

[3] The packaging material for battery cases as recited in the aforementioned Item 1 or 2, wherein the shrinkage percentage of the oriented film is 5 to 10%.

[4] The packaging material for battery cases as recited in any one of the aforementioned Items 1 to 3, wherein a thickness of the heat resistant oriented film layer is 12 to 50 μm, a thickness of the thermoplastic resin non-oriented film layer is 20 to 80 μM and a thickness of the aluminum foil layer is 5 to 50 μm.

[5] The packaging material for battery cases as recited in any one of the aforementioned Items 1 to 4, wherein the heat resistant resin oriented film layer and the aluminum foil layer are integrally laminated via a urethane series adhesive layer.

[6] A battery case obtained by subjecting the packaging material as recited in any one of the aforementioned Items 1 to 5 to deep drawing or stretch forming.

Effects of the Invention

According to the invention as recited in the aforementioned Item [1], since as the heat resistant resin oriented film layer, a heat resistant resin oriented film having a shrinkage percentage of 2 to 20% is used, the packaging material is excellent in formability of, e.g., deep drawing and stretch forming. This makes it possible to perform sharp, deep and high configuration forming. Thus, since excellent formability can be secured without requiring coating of slip characteristics imparting components, it is not required to provide a step of coating slip characteristics components as required in a prior art, and therefore it is excellent in productivity. Furthermore, since it is not especially required to increase the thickness of the outer layer film with respect to the thickness of the aluminum foil layer as in a prior art technique, sufficient volumetric energy density can be secured.

According to the invention as recited in the aforementioned Item [2], since as the heat resistant resin oriented film layer constituting an outer layer, a biaxially-oriented polyamide film having a shrinkage percentage of 2 to 20%, a biaxially-oriented polyethylene naphthalate film having a shrinkage percentage of 2 to 20%, or a biaxially-oriented polyethylene terephthalate film having a shrinkage percentage of 2 to 20% is used, it is especially excellent in formability of, e.g., deep drawing and stretch forming. Thus, it becomes possible to attain sharper and deeper configuration forming. Since excellent formability can be secured without coating slip characteristics imparting components as mentioned above, it is not required to provide a step of coating slip characteristics imparting components as required in a prior art technique, and thus it is excellent in productivity. Furthermore, since it is not especially required to increase the thickness of the outer layer film with respect to the thickness of the aluminum foil layer as in a prior art technique, sufficient volumetric energy density can be secured.

According to the invention as recited in the aforementioned Item [3], since the shrinkage percentage of the oriented film is to 10%, the formability of, e.g., deep drawing or stretch forming can be improved, which enables higher and deeper configuration forming.

According to the invention as recited in the aforementioned Item [4], generation of pinholes can be sufficiently prevented and cost reduction can be attained.

According to the invention as recited in the aforementioned Item [5], since the heat resistant resin oriented film layer and the aluminum foil layer are integrally bonded via a urethane series adhesive layer, sharper forming can be attained.

According to the invention as recited in the aforementioned Item [6], it is possible to provide a battery case having a sharp and deep configuration.

DESCRIPTION OF REFERENCE NUMERALS

1 . . . Packaging material for battery cases
2 . . . Outer layer (heat resistant resin oriented film layer)
3 . . . Inner layer (thermoplastic resin non-oriented film layer)
4 . . . Aluminum foil layer

BEST MODE FOR CARRYING OUT THE INVENTION

Figure 1:
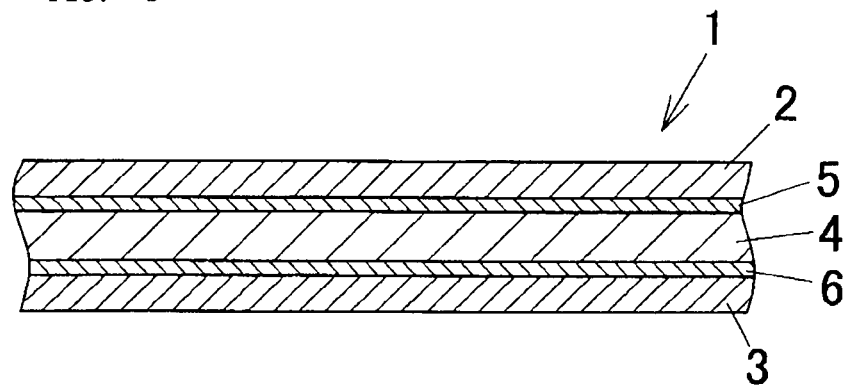
FIG. 1 is a cross-sectional view showing an embodiment of a packaging material for battery cases according to the present invention.

An embodiment of the packaging material 1 for battery cases according to the present invention is shown in FIG. 1. This packaging material is used as a packaging material for lithium-ion secondary batteries. This packaging material 1 for battery cases has a structure in which a heat resistant resin oriented film layer (outer layer) 2 is integrally laminated on an upper surface of an aluminum foil layer 4 via a first adhesive layer 5 and a thermoplastic resin non-oriented film layer (inner layer) 3 is integrally laminated on a lower surface of the aluminum foil layer 4 via a second adhesive layer 6.

The heat resistant resin oriented film layer (outer layer) 2 is a member which mainly undertakes a role of securing good formability as a packaging material, i.e., which mainly undertakes a role of preventing breakage of the aluminum foil due to necking which may sometimes occur at the time of the forming. In this invention, as the heat resistant resin oriented film layer 2, it is necessary to use a heat resistant resin oriented film having shrinkage percentage of 2 to 20%. If the shrinkage percentage is less than 2%, breakage and/or cracks of the packaging material may occur at the time of performing shape forming, such as, e.g., deep drawing or stretch forming. On the other hand, it the shrinkage percentage exceeds 20%, detachment of the heat resistant resin oriented film layer 2 and the aluminum foil layer 4 may occur after performing shape forming, such as, e.g., deep drawing or stretch forming.

Among other things, as the heat resistant resin oriented film, if is preferable to use a heat resistant resin oriented film having shrinkage percentage of 5 to 10%.

Furthermore, as the heat resistant resin oriented film layer 2, it is preferable to use a biaxially-oriented polyamide film having shrinkage percentage of 2 to 20%, a biaxially-oriented polyethylene naphthalate (PEN) film having shrinkage percentage of 2 to 20% or a biaxially-oriented polyethylene terephthalate (PET) film having shrinkage percentage of 2 to 20%. In this case, the formability of, e.g., deep drawing or stretch forming can be further improved, which enables sharper and deeper configuration forming.

The aforementioned "shrinkage percentage" denotes a size change rate of a test piece in the oriented direction before and after the immersion of the test piece (10 cm×10 cm) of the heat resistant resin oriented film 2 in 95° C. hot water for 30 minutes, and can be obtained by the following equation.

Shrinkage percentage(%)={$(X-Y)/X$}×100

X: oriented directional size before the immersion treatment
Y: oriented directional size after the immersion treatment The shrinkage percentage in the case of employing a biaxially-oriented film is an average value of the size change rates in two oriented directions.

The shrinkage percentage of the heat resistant resin oriented film 2 can be controlled by, for example, adjusting the heat setting temperature at the time of the stretch processing.

It is preferable that the thickness of the heat resistance resin oriented film layer 2 is set to 12 to 50 μm.

The thermoplastic resin non-oriented film layer (inner layer) 3 is a member for undertaking a role of giving excellent chemical resistance against strong corrosive electrolytic solution used for, e.g., lithium-ion secondary batteries and also giving heat sealing nature to the packaging material.

The thermoplastic resin non-oriented film layer 3 is not specifically limited. But, the layer 3 is preferably constituted by a non-oriented film made of at least one of thermoplastic resins selected from the group consisting polyethylene, polypropylene, orefin series copolymer, acid modification thereof, and ionomer.

The thickness of the thermoplastic resin non-oriented film layer 3 is preferably set to 20 to 80 μm. Setting the thickness 20 μm or above enables sufficient prevention of generation of pinholes, and setting the thickness 80 μm or below enables reduction of resin amount and cost reduction. Among other things, it is more preferable that the thickness of the thermoplastic resin non-oriented film layer 3 is set to 30 to 50 μm.

The heat resistant resin oriented film layer 2 and the thermoplastic resin non-oriented film layer 3 each can be a single layer or a multiple layer.

The aluminum foil layer 4 is a member for undertaking a role of giving gas barrier nature of preventing intrusion of oxygen and/or water content to the packaging material. As the aluminum foil layer 4, a foil made of pure aluminum or Al—Fe series alloy having a thickness of 5 to 50 μm can be preferably used.

The first adhesive layer 5 is not specifically limited. For example, urethane series adhesive layer and acrylic series adhesive layer can be exemplified. Among other things, it is preferable that the first adhesive layer 5 is a urethane series adhesive layer made of urethane series two-component adhesive. In this case, forming can be performed more sharply.

The second adhesive layer 6 is not specifically limited. For example, an adhesive layer made of resin containing urethane series resin, acrylic resin or thermoplastic elastomer, or acid-modified polyolefin such as, e.g., maleic anhydride acid-modified polyethylene or maleic anhydride acid-modified polypropylene. The second adhesive layer 6 can be formed by, for example, laminating an adhesive resin film (e.g., acid-modified polyolefin film) on one surface of the thermoplastic resin non-oriented film layer 3.

The aforementioned embodiment employs the structure provided with the first adhesive layer 5 and the second adhesive layer 6. However, both the layers 5 and 6 are not essential structural layers. A structure not provided with these layers can be employed.

The packaging material for battery cases according to the present invention can be preferably used as a packaging material for lithium-ion secondary battery cases which requires high volume energy density, but not limited to such usage.

By subjecting the packaging material 1 for battery cases according to the present invention to forming (e.g., deep drawing or stretch forming), a battery case can be obtained.

EXAMPLE

Next, concrete examples of the present invention will be explained, but the present invention is not specifically limited to these examples.

Example 1

Figure 2:
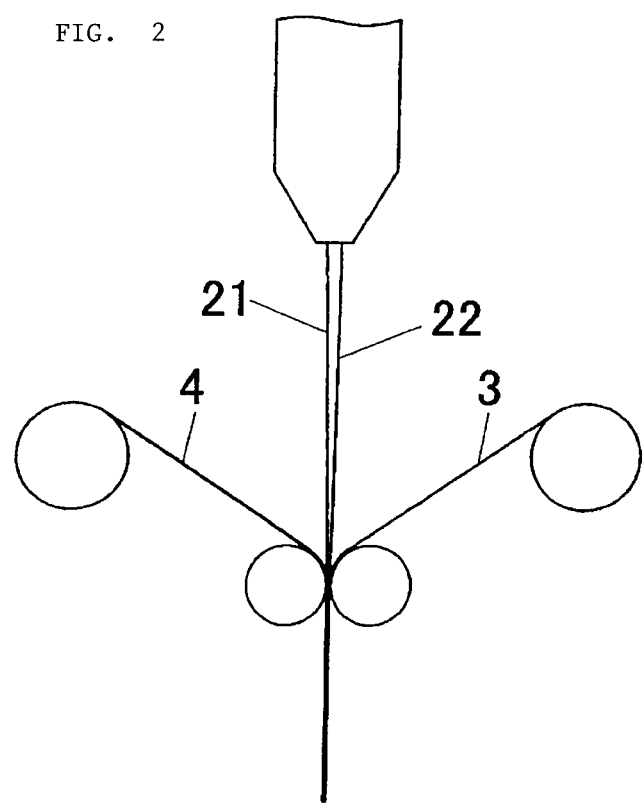
FIG. 2 is a view showing an example of a production method of a packaging material for battery cases according to the present invention.

As shown in FIG. 2, while co-extruding a maleic anhydride acid-modified polypropylene layer 21 having a thickness of 3 μm and a non-modified polypropylene layer 22 having a thickness of 12 μm, an aluminum foil 4 (AA8079-O material) having a thickness of 40 μm was supplied from the left side of FIG. 2 and a non-oriented film 3 having a thickness of 30 μm made of polypropylene was supplied from the right side of FIG. 2, and the aluminum foil 4 and the non-oriented film 3 were laminated with the co-extruded maleic anhydride acid-modified polypropylene layer 21 and non-modified polypropylene layer 22 disposed therebetween with a pair of heating pressure rollers.

Next, on the surface of the aluminum foil 4 of the obtained laminated film, urethane series resin adhesive 5 was applied with a gravure roll, and then the adhesive was dried to some degree by heat. Thereafter, on the adhesive surface, a biaxially-oriented film 2 made of nylon having a thickness of 25 μm and shrinkage percentage of 10% was laminated. Thus, a packaging material for battery cases was obtained.

Example 2

A packaging material for battery cases was obtained in the same manner as in Example 1 except that a biaxially-oriented film made of nylon having a thickness of 15 μm and shrinkage percentage of 15% was used in place of the biaxially-oriented film made of nylon having a thickness of 25 μm and shrinkage percentage of 10%.

Example 3

A packaging material for battery cases was obtained in the same manner as in Example 1 except that a biaxially-oriented film made of nylon having a thickness of 15 μm and shrinkage percentage of 7% was used in place of the biaxially-oriented film made of nylon having a thickness of 25 μm and shrinkage percentage of 10%.

Comparative Example 1

A packaging material for battery cases was obtained in the same manner as in Example 1 except that a biaxially-oriented film made of nylon having a thickness of 25 μm and shrinkage percentage of 1% was used in place of the biaxially-oriented film made of nylon having a thickness of 25 μm and shrinkage percentage of 10%.

Comparative Example 2

A packaging material for battery cases was obtained in the same manner as in Example 1 except that a biaxially-oriented film made of nylon having a thickness of 25 μm and shrinkage percentage of 25% was used in place of the biaxially-oriented film made of nylon having a thickness of 25 μm and shrinkage percentage of 10%.

Example 4

A packaging material for battery cases was obtained in the same manner as in Example 1 except that a biaxially-oriented film made of polyethylene telephthalate (PET) having a thickness of 12 μm and shrinkage percentage of 18% was used in place of the biaxially-oriented film made of nylon having a thickness of 25 μM and shrinkage percentage of 10%.

Example 5

A packaging material for battery cases was obtained in the same manner as in Example 1 except that a biaxially-oriented film made of polyethylene telephthalate (PET) having a thickness of 20 μm and shrinkage percentage of 5% was used in place of the biaxially-oriented film made of nylon having a thickness of 25 μm and shrinkage percentage of 10%.

Example 6

A packaging material for battery cases was obtained in the same manner as in Example 1 except that a biaxially-oriented film made of polyethylene telephthalate (PET) having a thickness of 12 μM and shrinkage percentage of 8% was used in place of the biaxially-oriented film made of nylon having a thickness of 25 μm and shrinkage percentage of 10%.

Comparative Example 3

A packaging material for battery cases was obtained in the same manner as in Example 1 except that a biaxially-oriented film made of polyethylene telephthalate (PET) having a thickness of 12 μm and shrinkage percentage of 1% was used in place of the biaxially-oriented film made of nylon having a thickness of 25 μm and shrinkage percentage of 10%.

Comparative Example 4

A packaging material for battery cases was obtained in the same manner as in Example 1 except that a biaxially-oriented film made of polyethylene telephthalate (PET) having a thickness of 12 μm and shrinkage percentage of 25% was used in place of the biaxially-oriented film made of nylon having a thickness of 25 μm and shrinkage percentage of 10%.

Example 7

A packaging material for battery cases was obtained in the same manner as in Example 1 except that a biaxially-oriented film made of polyethylene naphthalate (PEN) having a thickness of 25 μm and shrinkage percentage of 10% was used in place of the biaxially-oriented film made of nylon having a thickness of 25 μm and shrinkage percentage of 10%.

Example 8

A packaging material for battery cases was obtained in the same manner as in Example 1 except that a biaxially-oriented film made of polyethylene naphthalate (PEN) having a thickness of 15 μm and shrinkage percentage of 15% was used in place of the biaxially-oriented film made of nylon having a thickness of 25 μm and shrinkage percentage of 10%.

Example 9

A packaging material for battery cases was obtained in the same manner as in Example 1 except that a biaxially-oriented film made of polyethylene naphthalate (PEN) having a thickness of 15 μm and shrinkage percentage of 7% was used in place of the biaxially-oriented film made of nylon having a thickness of 25 μm and shrinkage percentage of 10%.

Comparative Example 5

A packaging material for battery cases was obtained in the same manner as in Example 1 except that a biaxially-oriented film made of polyethylene naphthalate (PEN) having a thickness of 25 μm and shrinkage percentage of 1% was used in place of the biaxially-oriented film made of nylon having a thickness of 25 μm and shrinkage percentage of 10%.

Comparative Example 6

A packaging material for battery cases was obtained in the same manner as in Example 1 except that a biaxially-oriented film made of polyethylene naphthalate (PEN) having a thickness of 25 μm and shrinkage percentage of 25% was used in place of the biaxially-oriented film made of nylon having a thickness of 25 μm and shrinkage percentage of 10%.

Evaluation of Occurrence of External Surface Detachment

The formed article (processed goods 3 mm formed height) obtained by the one step deep drawing was left in a dryer at 80° C. for 3 hours, and then visual inspection was performed to find whether the outer surface layer caused delamination (detachment).

As will be apparent from the Table, the packaging materials for battery cases of Examples 1 to 9 were excellent in formability and capable of forming sharp and deep configuration. Furthermore, no detachment of the outer surface layer occurred.

To the contrary, in Comparative Examples 1, 3 and 5 in which the shrinkage percentage was less than 2%, the formability was insufficient. Furthermore, in Comparative Examples 2, 4 and 6 in which the shrinkage percentage exceeded 20%, delamination of the outer layer occurred.

This application claims priority to Japanese Patent Application No. 2005-154883 filed on May 27, 2005, the entire disclosure of which is incorporated herein by reference in its entirety.

The terms and expressions which have been employed herein are used as terms of description and not of limitation of this invention. It is recognized that various any modifications are possible within the scope of the invention claimed so long as they do not extend beyond the spirit of the invention.

TABLE 1

| | Structure of outer layer (oriented film) | | | Formability | | | | Occurrence |
|---|---|---|---|---|---|---|---|---|
| | Resin | Thickness (μm) | Shrinkage percentage (%) | 6 mm processed | 5 mm processed | 4 mm processed | 3 mm processed | of detachment |
| Comp. Example 1 | Nylon | 25 | 1 | x | x | Δ | o | Nil |
| Example 1 | Nylon | 25 | 10 | o | o | o | o | Nil |
| Example 2 | Nylon | 15 | 15 | Δ | o | o | o | Nil |
| Example 3 | Nylon | 15 | 7 | Δ | o | o | o | Nil |
| Comp. Example 2 | Nylon | 25 | 25 | o | o | o | o | Detached |
| Comp. Example 3 | PET | 12 | 1 | x | x | x | o | Nil |
| Example 4 | PET | 12 | 18 | Δ | Δ | o | o | Nil |
| Example 5 | PET | 20 | 5 | Δ | Δ | o | o | Nil |
| Example 6 | PET | 12 | 8 | Δ | Δ | o | o | Nil |
| Comp. Example 4 | PET | 12 | 25 | x | x | Δ | o | Detached |
| Comp. Example 5 | PEN | 25 | 1 | x | x | x | o | Nil |
| Example 7 | PEN | 25 | 10 | Δ | Δ | o | o | Nil |
| Example 8 | PEN | 15 | 15 | Δ | Δ | o | o | Nil |
| Example 9 | PEN | 15 | 7 | Δ | Δ | o | o | Nil |
| Comp. Example 6 | PEN | 25 | 25 | x | Δ | o | o | Detached |

As to each packaging material for battery cases obtained as mentioned above, performance was evaluated based on the following evaluation method.

Evaluation Method of Formability

A packaging material was formed into a blank configuration 110×180 mm and subjected to one step deep drawing with a straight die having a free forming height, and the formability was evaluated every forming height (6 mm, 5 mm, 4 mm, 3 mm) as follows. "0" denotes no crack was generated, "Δ" denotes although cracks were generated at small portions but almost no crack was generated, and "x" denotes cracks were generated almost at the entire surface. The punch shape of the die employed was 60 mm in long side, 45 mm in short side, 1-2 mm in corner R, 1-2 mm in punch shoulder, and 0.5 mm in die shoulder.

INDUSTRIAL APPLICABILITY

A packaging material for battery cases can be used for, e.g., a packaging material for battery cases, such as, e.g., lithium-ion secondary battery cases.

The invention claimed is:
1. A battery case comprising
a packaging material for battery cases comprising:
a heat resistant resin oriented film layer constituting an outer layer;
a thermoplastic resin non-oriented film layer constituting an inner layer; and
an aluminum foil layer disposed between the inner and outer layers,
wherein the heat resistant resin oriented film comprises a biaxially-oriented polyamide film having a shrinkage percentage of 2 to 20%, wherein the shrinkage percentage denotes a size change rate of a test piece in the oriented direction before and after the immersion of the test piece (10 cm×10 cm) of the biaxially oriented polyamide film in 95° C. hot water for 30 minutes, and can be obtained by the following equation, which is an average value of the size change rates in two oriented directions:

shrinkage percentage(%)={(X−Y)/X}×100

X: oriented directional size before the immersion treatment
Y: oriented directional size after the immersion treatment,
wherein a thickness of the biaxially-oriented polyamide film layer is 12 to 50 µm, a thickness of the thermoplastic resin non-oriented film layer is 20 to 80 µm and a thickness of the aluminum foil layer is 5 to 50 µm,
wherein the biaxially-oriented polyamide film layer and the aluminum foil layer are integrally laminated via a urethane series adhesive layer,
wherein the aluminum foil layer and the thermoplastic resin non-oriented film layer are integrally laminated via an acid-modified polyolefin adhesive layer, and
a deep drawing or stretch forming is performed on the packaging material for battery cases.

2. A battery case comprising:
a packaging material for battery cases comprising:
a heat resistant resin oriented film layer constituting an outer layer;
a thermoplastic resin non-oriented film layer constituting an inner layer; and
an aluminum foil layer disposed between the inner and outer layers,
wherein the heat resistant resin oriented film comprises a biaxially-oriented polyethylene terephthalate film having a shrinkage percentage of 2 to 20%, wherein the shrinkage percentage denotes a size change rate of a test piece in the oriented direction before and after the immersion of the test piece (10 cm×10 cm) of the biaxially-oriented polyethylene terephthalate film in 95° C. hot water for 30 minutes, and can be obtained by the following equation, which is an average value of the size change rates in two oriented directions:

shrinkage percentage(%)={(X−Y)/X}×100

X: oriented directional size before the immersion treatment
Y: oriented directional size after the immersion treatment,
wherein a thickness of the biaxially-oriented polyethylene terephthalate film layer is 12 to 50 µm, a thickness of the thermoplastic resin non-oriented film layer is 20 to 80 µm and a thickness of the aluminum foil layer is 5 to 50 µm,
wherein the biaxially-oriented polyethylene terephthalate film layer and the aluminum foil layer are integrally laminated via a urethane series adhesive layer, wherein the aluminum foil layer and the thermoplastic resin non-oriented film layer are integrally laminated via an acid-modified polyolefin adhesive layer, and
a deep drawing or stretch forming is performed on the packaging material for battery cases.

3. A battery case comprising:
a packaging material for battery cases comprising:
a heat resistant resin oriented film layer constituting an outer layer;
a thermoplastic resin non-oriented film layer constituting an inner layer; and
an aluminum foil layer disposed between the inner and outer layers,
wherein the heat resistant resin oriented film comprises a biaxially-oriented polyethylene naphthalate film having a shrinkage percentage of 2 to 20%,
wherein the shrinkage percentage denotes a size change rate of a test piece in the oriented direction before and after the immersion of the test piece (10 cm×10 cm) of the biaxially-oriented polyethylene naphthalate film in 95° C. hot water for 30 minutes, and can be obtained by the following equation, which is an average value of the size change rates in two oriented directions:

shrinkage percentage(%)={(X−Y)/X}×100

X: oriented directional size before the immersion treatment
Y: oriented directional size after the immersion treatment,
wherein a thickness of the biaxially-oriented polyethylene naphthalate film layer is 12 to 50 µm, a thickness of the thermoplastic resin non-oriented film layer is 20 to 80 µm and a thickness of the aluminum foil layer is 5 to 50 µm,
wherein the biaxially-oriented polyethylene naphthalate film layer and the aluminum foil layer are integrally laminated via a urethane series adhesive layer, wherein the aluminum foil layer and the thermoplastic resin non-oriented film layer are integrally laminated via an acid-modified polyolefin adhesive layer, and
a deep drawing or stretch forming is performed on the packaging material for battery cases.

4. A battery case comprising:
a packaging material for battery cases comprising:
a heat resistant resin oriented film layer constituting an outer layer;
a thermoplastic resin non-oriented film layer constituting an inner layer; and
an aluminum foil layer disposed between the inner and outer layers,
wherein the heat resistant resin oriented film is a multiple layer comprising a plurality of films selected from a biaxially-oriented polyamide film having a shrinkage percentage of 2 to 20%, a biaxially-oriented polyethylene terephthalate film having a shrinkage percentage of 2 to 20% and a biaxially-oriented polyethylene naphthalate film having a shrinkage percentage of 2 to 20%,
wherein the shrinkage percentage denotes a size change rate of a test piece in the oriented direction before and after the immersion of the test piece (10 cm×10 cm) of the heat resistant resin oriented film in 95° C. hot water for 30 minutes, and can be obtained by the following equation, which is an average value of the size change rates in two oriented directions:

shrinkage percentage(%)={(X−Y)/X}×100

X: oriented directional size before the immersion treatment
Y: oriented directional size after the immersion treatment,
wherein a thickness of the heat resistant resin oriented film layer is 12 to 50 µm, a thickness of the thermoplastic resin non-oriented film layer is 20 to 80 µm and a thickness of the aluminum foil layer is 5 to 50 µm,
wherein the heat resistant resin oriented film layer and the aluminum foil layer are integrally laminated via a urethane series adhesive layer, wherein the aluminum foil layer and the thermoplastic resin non-oriented film layer are integrally laminated via an acid-modified polyolefin adhesive layer, and
a deep drawing or stretch forming is performed on the packaging material for battery cases.

* * * * *